July 4, 1961    F. W. WETHERBEE ET AL    2,990,933
TRANSFER MECHANISMS
Filed Nov. 24, 1958    2 Sheets-Sheet 1

Inventors
Frank W. Wetherbee
Harry Phillips
By their Attorney
Richard A. Wise

July 4, 1961   F. W. WETHERBEE ET AL   2,990,933
TRANSFER MECHANISMS
Filed Nov. 24, 1958   2 Sheets-Sheet 2
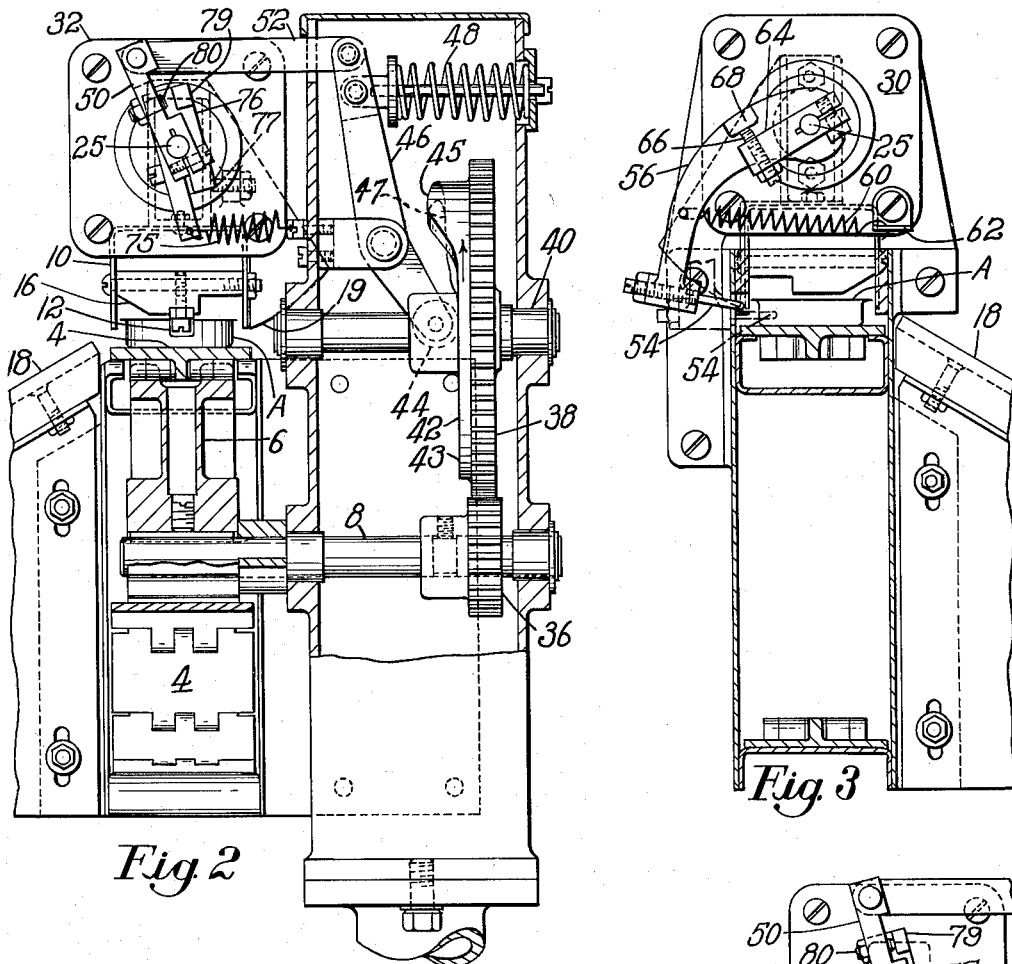
Fig. 2
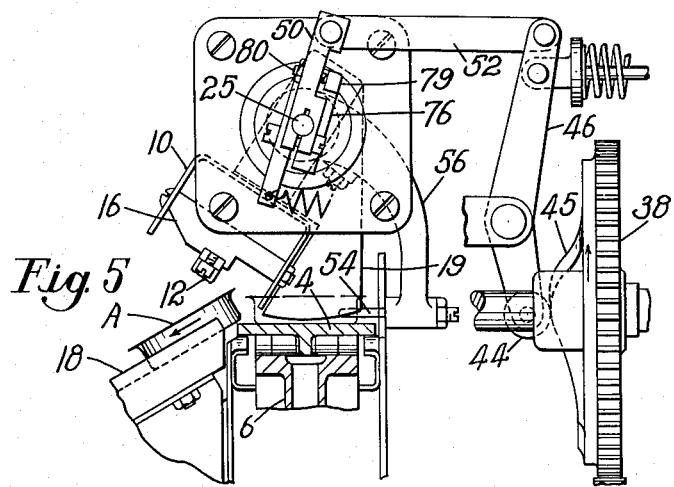
Fig. 5
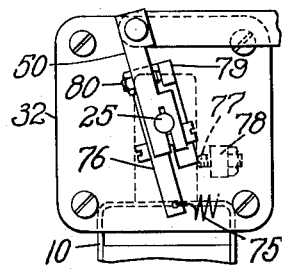
Fig. 3
Fig. 4

United States Patent Office 2,990,933
Patented July 4, 1961

2,990,933
TRANSFER MECHANISMS
Frank W. Wetherbee and Harry Phillips, Hamilton, Mass., assignors to United Shoe Machinery Corporation, Flemington, N.J., a corporation of New Jersey
Filed Nov. 24, 1958, Ser. No. 775,888
2 Claims. (Cl. 198—31)

This invention relates to article handling and more particularly to mechanisms for transferring articles from a conveyor and arranging them in uniform groups. Articles which are mass produced continuously usually require conveyor means for removing them from the machines on which they are made. One conveyor frequently employed for this purpose is the well-known endless belt or chain type which transports articles at uniform speed in single file. Where the articles are subsequently to be packaged or when additional work is to be performed upon them, it is often necessary for the articles to be re-grouped as to number and arrangement. For example, receptacles, such as cans, which are filled with a material in a heated state often must be cooled before being packaged and a convenient way of doing this is to arrange the cans on a traveling belt for passage through a cooling chamber. It is essential that the receptacles be uniformly spaced from each other to permit the free circulation of the cooling medium which is usually refrigerated air. The most convenient arrangement for this purpose is in groups of a predetermined number arranged in parallel spaced rows with the cans uniformly spaced abreast of each other. As another example, such cans are often packaged in a gross container in layers made up of parallel rows with a uniform number of cans in each row.

With the obvious necessity and utility for such mechanism to accomplish the above, one of the objects of our invention is to provide mechanism for transferring articles moving in single file into groups or rows uniform as to number and configuration.

Another object of our invention is to provide a mechanism for transferring a predetermined number of articles from a continuously moving line into successive parallel rows in spaced relationship.

A third object of our invention is to provide an article handling mechanism which removes a predetermined number of articles from a continuously moving conveyor and which interrupts the further passage of articles along the conveyor while it is performing a subsequent distributing operation on the removed articles.

Still another object of this invention is to provide an article transfer mechanism for removing articles from a continuously moving conveyor, which mechanism has means for preventing damage to subsequent articles moving along the conveyor as it performs a transfer operation on the removed articles.

It is still another object of this invention to provide a transfer mechanism for removing articles from a continuously moving conveyor which will operate without damaging articles regardless of where the articles are located on the conveyor with respect to the transfer mechanism or when operation of the transfer mechanism is begun.

In accordance with these objects and as a feature of our invention we provide a transfer mechanism for displacing articles from a longitudinally moving conveyor by which the articles are transported continuously in single file. A distributor housing is provided to receive articles from the conveyor through an opening in one end and to displace them in rows with the articles arranged abreast of each other onto a receiver disposed in angular relation to the conveyor. The distributor housing has positioning means at its closed end against which the leading article on the conveyor stops, whereupon the next article entering the conveyor housing engages the leading article. In similar manner each successive article engages its predecessor and stops. The positioning means is adjustable lengthwise of the housing whereby a predetermined number of articles will fit within the housing. Operated in timed relationship with the conveyor is an article interrupting or stop member in the form of a movable finger positioned in advance of the distributor. This stop member interrupts passage of articles along the conveyor when one article more than the predetermined number has passed the location of the stop. Located adjacent the opening of the conveyor is a camming blade. When the distributor is moved to discharge the articles it has received, the one article in addition to the predetermined number which has passed the stop means is cammed by the blade away from the distributor housing so that it will not be damaged by the housing in its distributing operation. The stop member is controlled to intersect the passage of articles by the conveyor a sufficient time in advance of the distributing motion of the housing to permit any article which has passed its operating position to enter the distributor housing before the housing is displaced. This is particularly advantageous at the beginning of a run when the distributor may be actuated in the middle of its cycle. The stop member assures that articles remain either wholly outside of the distributor housing or wholly within it and never in a position whereby they could be damaged by being partially inside or partially outside.

While this invention has particular utility in transferring articles from a longitudinally moving conveyor it is not so limited. Furthermore, it will be obvious that the inventive principles may be included in mechanisms for distributing articles in groups having various configurations and numbers.

The above and other features of the invention including various novel details of construction and combinations of parts will now be more particularly described with reference to the accompanying drawings and pointed out in the claims.

In the drawings,

FIG. 2 is a view, partly in section, of the right-hand end of the machine shown in FIG. 1 in article receiving position with the articles being conveyed toward the viewer;

FIG. 3 is a view, partly in section, of the left-hand end of the machine shown in FIG. 1 in article receiving position with the articles being conveyed away from the viewer; and FIGS. 4 and 5 are detail views of portions of the machine shown in FIG. 2 just prior to and during the article discharging operation of the machine respectively.

Figure 1:
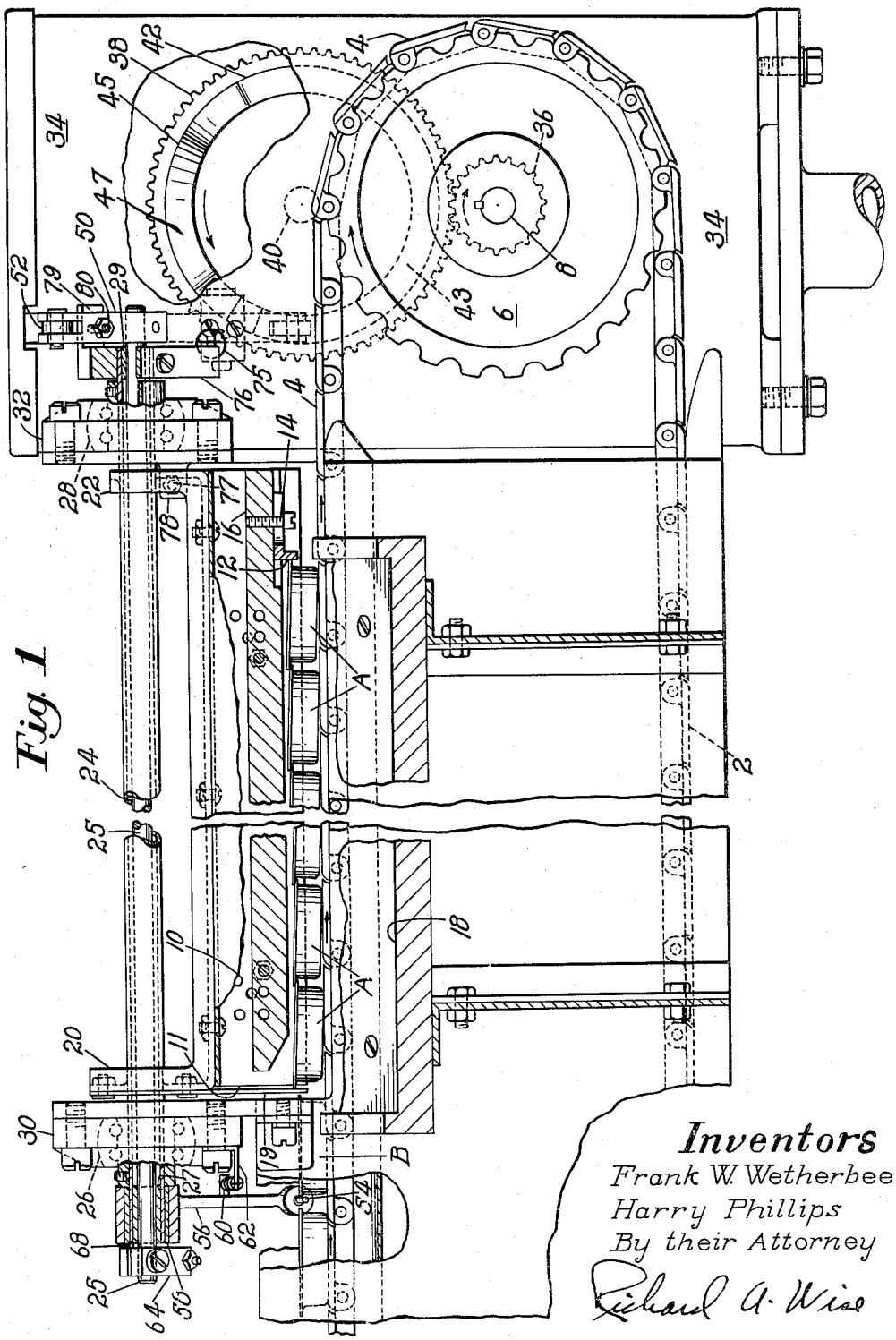
FIG. 1 is a side elevation, partly in section, of an article transfer machine embodying the invention and employed with a longitudinally moving conveyor.

The invention is illustrated embodied in a machine for transferring articles from a conveyor comprising a longitudinally moving endless belt 2 formed of "table top" links 4. The articles conveyed, designated A in the drawings, are shown as cylindrical receptacles or containers having flanged and sealed upper edges. It will be understood, of course, these particular articles are shown by way of illustration only since the invention may be embodied in machines for handling articles of any size and shape. The conveyor belt 2 moves continuously, being driven by a sprocket wheel 6 secured to a shaft 8 which derives its power from any convenient means (not shown). Mounted above the conveyor is a distributor housing 10 having, in general, an inverted U-shaped cross section. The articles A, which in FIG. 1 are shown moving from left to right in single file, enter the housing through an opening in its left-hand end and the first article so entering comes to rest against a positioning member 12 adjustably secured by a slot and screw connection 14 to an insert 16 fixed within the housing 10. The location of the adjustable positioning member 12, in conjunction with the length of the housing, predetermines the number of articles which will fit within the housing, since after the first article comes to rest against the positioning member each subsequent article comes to rest by contacting its predecessor, as shown in FIG. 1. While the articles thus stop moving, the conveyor does not, but its flat links 4 slide along the bottom surfaces of the articles. When the predetermined number of articles have entered the distributor 10, it is pivoted as shown in FIG. 5, by means subsequently to be described, to discharge the articles, arranged in a line abreast of each other, onto an inclined chute or receiver 18 disposed in angular relationship to the conveyor. When the distributor is in discharging position, a first interrupting means in the form of a camming blade 19 located adjacent to the entrance end of the housing 10 and movable as a unit therewith, interrupts the further passage of articles along the conveyor.

The housing 10 depends from brackets 20 and 22 which are secured to a hollow shaft or tube 24 extending lengthwise above the conveyor belt 2. A rod 25 is located within the shaft. The shaft is journaled in bearings 26, 28 in upwardly extending portions 30, 32 of the machine frame 34 while the rod 25 is freely rotatable within the shaft, being journaled in bearings 27 and 29. Secured to the shaft 8 which drives the conveyor sprocket 6 is a gear 36 (best seen in FIGS. 1 and 2) which meshes with a gear 38 which in turn is secured to a shaft 40 journaled in the machine frame 34. Located on the inner face of the gear 38 is a profile cam 42 having a flat dwell portion 43 and a rise 45. A cam follower 44, journaled at an end of a lever 46, is held in engagement with the face of the cam by a compression spring 48. A bifurcated lever 50 is clamped to the rod 25 and is pivotally attached at its opposite end to the upper end of the lever 46 by a connecting link 52. It will be seen that as the cam 42 is rotated continuously, intermittent oscillating motion is imparted to the rod 25. Since the gear 36 is smaller than the gear 38 and since there is substantial dwell space 43 on the face of the cam 42, there will be considerable linear travel of the conveyor belt 2 between each oscillation of the rod 25.

A second article interrupting means in the form of a stop member or finger 54 (FIGS. 1 and 3) is provided to interrupt the passage of articles along the conveyor in advance of the first interrupting means or camming blade 19 and the distributor housing 10. Movement of the finger 54 into and out of the path of movement of the articles is controlled by the oscillating motion of the rod 25. The finger is adjustably secured in the end of a lever 56 which is mounted for free rotation relatively to the shaft 24 on a bearing 58. The lever 56 and consequently the finger 54 are urged in a counterclockwise direction, as viewed in FIG. 3 (which is looking in the direction of movement of the articles along the conveyor), by a tension spring 60 stretched between the lever and a bracket 62 on the upwardly extending portion 30 of the machine frame. However, movement of the lever and finger in a counterclockwise direction, as so viewed, is restricted by a release control lever 64 which is clamped to the rod 25. Threaded in the lever 64 is an adjustable stop screw 66 which engages a projecting lug 68 on the lever 56.

It will be seen from FIG. 2 that when the cam 42 causes the follower lever 46 to pivot in a clockwise direction, the rod 25 also pivots in a clockwise direction. Viewing this motion from FIG. 3 which, is looking in the opposite direction, the rotative movement of the rod 25 is in a counterclockwise direction whereupon the release control lever 64 backs away from the lug 68 and the spring 60 pulls the lever 56 in a counterclockwise direction whereupon the stop finger 54 moves into the broken line position (FIG. 3) interrupting the movement of the articles along the conveyor 4. It will be noted, that up to this time the distributor housing 10 has not moved.

The movement of the housing 10 is controlled in the following manner. It is normally maintained in article receiving position, as seen in FIG. 2, by a tension spring 75 stretched between the frame 34 and a motion transmitting lever 76. The lever 76 is clamped to the hollow shaft 24, to which the housing is likewise secured. An adjustable setscrew 77 threaded in a lug 78 on the frame member 32 and engageable with the bracket 22 constitutes a stop for adjusting the position of the housing 10. A projecting lug 79 on the lever 76 is located in the path of movement of an adjustable screw 80 threaded in the lever 50. However, a gap is left between the end of the screw 80 and the projecting lug 79 such that there is lost motion between the initial movement of the lever 50 and the lever 76. This assures that displacement of the distributor housing 10 will not take place when the finger 54 is initially moved to intersect the path of movement of the articles.

The manner in which the above-described mechanism operates to transfer articles will now be explained. At the beginning of a cycle, the machine's parts occupy the positions shown in FIGS. 2 and 3 with the cam follower 44 held against the flat face or dwell portion 43 of the cam 42. The distributor housing 10 is in its article receiving position and the stop finger 54 is retracted from the path of movement of the articles. The articles enter the housing 10 from left to right, as viewed in FIG. 1, until the leading article engages the positioning member 12 whereupon it comes to rest and each succeeding article following it succesively engages its predecessor until the housing has received its predetermined number or complement of articles. Thereupon the rise 45 of the cam 42 displaces the follower 44, which, in the manner explained above, causes the rod 25 to rotate. This permits the stop finger 54 to move from the solid to the broken line position as shown in FIG. 3. Simultaneously, the gap between the screw 80 and the projection 79 on the lever 76 closes, as seen in FIG. 4, but the distributor 10 does not move. In the broken line position the finger 54 interrupts the passage of articles along the conveyor. Since the rotative movement of the rod 25 is a function of the linear speed of the conveyor belt, the movement of the finger and that of the housing 10 are likewise functions of the linear speed of the conveyor. The interruption of the passage of artices by the finger 54 is timed to take place only after one more than the predetermined number of articles has passed the stop finger in its movement toward the distributor housing. This one additional article is designated by the character B in the drawings.

While the cam follower 44 engages a plateau 47 on the cam rise portion 45 no movement of the rod 25 takes place. After the expiration of a predetermined length of time determined by the length of the plateau, the distributor housing 10 begins to pivot from its article receiving position (FIGS. 2 and 3) to its discharging position as shown in FIG. 5. At this time, the camming blade or first interrupting means 19 causes the one additional article B to be cammed away from the housing so that it will not be damaged by the distributing movement of the housing 10.

It is at this point in the operation that the importance of the finger 54 becomes manifest. In preventing successive articles on the conveyor from "piling up" against the article B, the camming blade or interrupting means 19 is able to displace the article B without damaging it. If the finger 54 did not interrupt the passage of the articles moving along the conveyor behind article B, they would, during the distributing movement, accumulate and bear against it with considerable force, and consequently, in pressing it against the blade could cause damage.

The distributing movement of the housing causes the articles to be discharged onto the receiving chute 18 in a row with the articles arranged abreast of each other. Thereafter, as the cam 42 continues to rotate and the follower descends the downwardly sloped portion of the rise 45, the distributor housing is returned to its initial or article receiving position with the screw 77 against the bracket 22 and the finger 54 is withdrawn.

A second function of the stop finger 54 likewise results in the prevention of damage to the articles being distributed. It will be remember that at all times during the movement of the housing 10 the finger is in article interrupting position so that articles cannot reach the housing. The delay which takes place after the movement of the finger 54 but before that of the distributor housing 10 is intentionally timed to be of sufficient duration to assure that any article on the conveyor belt 2 which has reached the location of the finger 54 has sufficient time to enter the distributor housing before the housing is pivoted. This assures that the article will not be damaged by the movement of the distributor as it would conceivably be if the distributor were actuated with the article exactly aligned with the face of its open end where the camming blade 19 is located. This time delay is particularly advantageous, at the beginning of a run, since it cannot be determined with any degree of certainty how many articles will be on the conveyor in advance of the distributor or how they may be separated.

Having thus described our invention, what we claim as new and desire to secure by Letters Patent of the United States is:

1. A transfer mechanism for transferring articles from a longitudinally moving conveyor comprising a distributor housing, an opening in one end of the housing into which articles pass in single file from the conveyor, positioning means in the other end of the housing against which the leading article stops whereupon additional articles entering the housing successively engage the leading article and each other, means mounting the positioning means for adjustment to accommodate a predetermined number of articles within the housing, stop means to interrupt the passage of articles along the conveyor, means to move the stop means into article interrupting position at a predetermined time relative to the movement of the conveyor to allow only one article in addition to the predetermined number to pass said stop means, and means for moving the housing in predetermined timed sequence with the movement of the conveyor to displace the housing from an article receiving position to an article discharging position in predetermined cycles of sufficient duration to permit the predetermined number of articles to be received in the housing.

2. A transfer mechanism for transferring articles from a longitudinally moving conveyor comprising a distributor housing, an opening in one end of the housing into which articles pass in single file from the conveyor, positioning means in the other end of the housing against which the leading article stops whereupon additional articles entering the housing successively engage the leading article and each other, means mounting the positioning means for adjustment to accommodate a predetermined number of articles within the housing, stop means to interrupt the passage of articles along the conveyor, means to move the stop means into article interrupting position at a predetermined time relative to the movement of the conveyor to allow only one article in addition to the predetermined number to pass said stop means, means for moving the housing in predetermined timed sequence with the movement of the conveyor to displace the housing from an article receiving position to an article discharging position after the predetermined number of articles have been received therein, and camming means at the open end of the housing constructed and arranged to deflect the one additional article away from the housing.

References Cited in the file of this patent
UNITED STATES PATENTS

| | | |
|---|---|---|
| 744,874 | Neeland | Nov. 24, 1903 |
| 1,654,706 | Schoen | Jan. 3, 1928 |
| 2,131,816 | Perkins | Oct. 4, 1938 |
| 2,144,761 | Herold | Jan. 24, 1939 |
| 2,848,094 | Pechy | Aug. 19, 1958 |